J. M. & O. W. Van Nosdall,
Hedge Trimmer.

No. 99,121.

2 Sheets, Sheet 1

Patented Jan 25 1870

Witnesses;

Inventors,
J. M. Van Nosdall
O. W. Van Nosdall
By L. L. Coburn
Atty

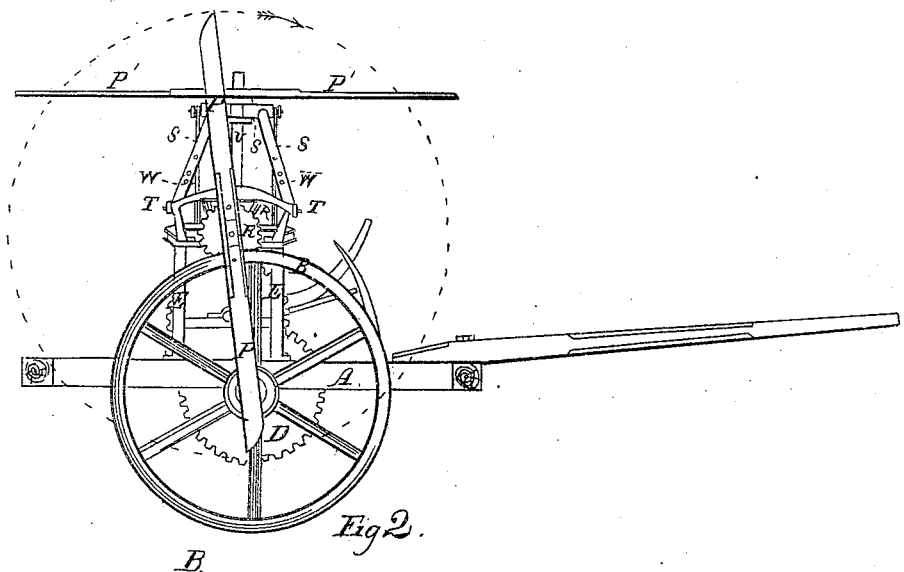
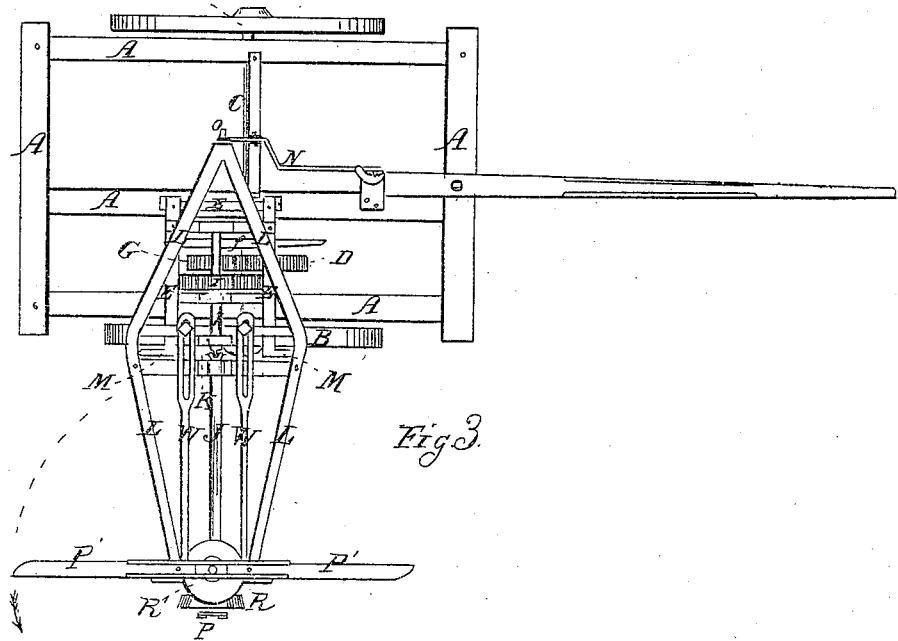

United States Patent Office.

JAMES M. VAN NOSDALL AND OLIVER W. VAN NOSDALL, OF NEWARK, ILLINOIS.

Letters Patent No. 99,121, dated January 25, 1870.

IMPROVED HEDGE-TRIMMER.

The Schedule referred to in these Letters Patent and making part of the same.

We, JAMES M. VAN NOSDALL and OLIVER W. VAN NOSDALL, of Newark, in the county of Kendall, and State of Illinois, have invented certain Improvements in Hedge-Trimmers, of which the following is a specification.

The nature of our invention consists of an adjustable pivoted frame, carried upon a vehicle drawn by horses, said frame having its outer end to project a proper distance over the wheel of the vehicle, and to the side thereof, and carrying at the outer end a pair of revolving knives or scythes, whereof one revolves perpendicularly, and the other across its path horizontally, thus shearing the hedge at the side and the top at one and the same time.

These knives are driven by proper gearing, with a motion communicated from the shaft or axle of the vehicle, and are made adjustable to any desired inclination, so as to cut the hedge squarely, or in a pyramidal form, all of which will be more fully hereinafter set forth.

Description of the Accompanying Drawings.

Figure 2 is a side elevation of same, taken from the side which carries the knives.

Figure 3 is a top or plan view of same.

Figure 1:
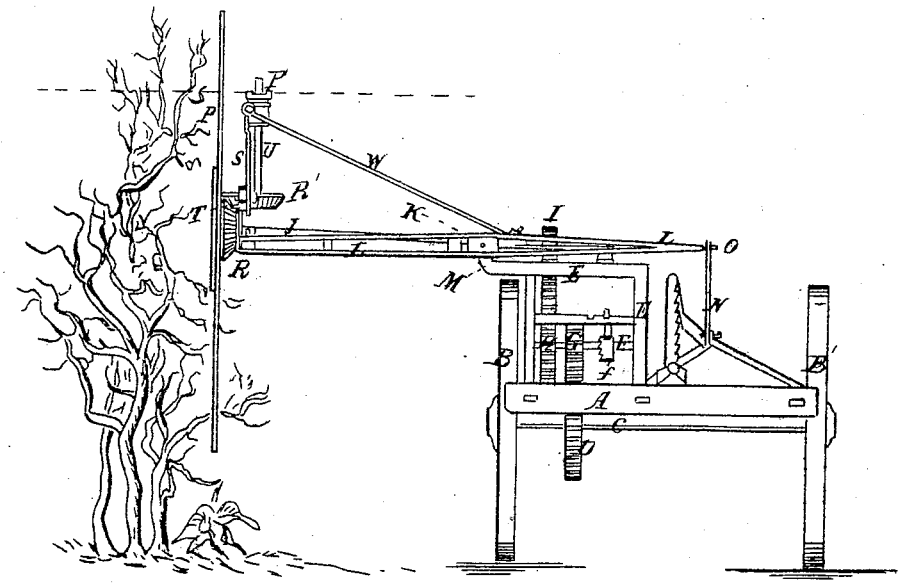
Figure 1 is a front elevation of our invention, showing the manner in which it engages with the hedge.

General Description.

A is the frame-work of the vehicle, carried upon the wheels B B'.

C is the shaft or axle of the vehicle, which carries the cog-wheel D.

E is an upright frame, carried on the frame-work A.

F is an intermediate shaft, having bearings upon the frame E.

G is a lesser cog-wheel, carried by the shaft F, and meshing into the cog-wheel D.

The shaft F carries also the cog-wheel H, which engages with a cog-wheel, I, carried upon the tumbling-rod or shaft J.

The interior part of this shaft J has bearings upon the frame E. The said shaft is jointed, at K, by a universal joint, beyond which it has bearings upon the pivoted carrier-frame L.

This carrier-frame is pivoted to arms M of the frame E, so as to swing up and down, and is made adjustable by the lever N, attached to the inside end O of the said frame L.

At the extreme outer end of the shaft J, and attached to the face of the mitred cog-wheel R, is carried the vertical revolving knife P.

S is an upright support, pivoted to the outer end of the frame L, at T.

U is an upright shaft bearing in the support S.

R' is a second mitred cog-wheel, carried at the lower extremity of the shaft U, meshing into the cog-wheel R.

At the top of the upright shaft U is carried the horizontal revolving knife P'.

The upright support S is made adjustable upon its pivots by the brace-rods W connecting with the frame L.

The machine is driven along the side of the hedge to be cut, and the gearing above described increases the motion it communicates, so that the knives P P' revolve with great rapidity, and shear the hedge at the top and one side at the same time.

If it is desired to cut the side in a pyramidal shape, the frame L is tilted upon its pivots by the lever N, which changes the plane of motion of both revolving knives.

The horizontal revolving knife may be changed, as to the plane of its motion, by swinging it out or in upon the pivots of the support S. The cog-wheels R R' are mitred or bevelled upon a circle, so as to admit this change of posture without disengaging their cogs.

The position of the frame L may be changed while the machine is under motion.

It will be readily understood that the knives P P' follow one another in their revolutions, so that they cannot interfere, the horizontal knife passing with one blade before the corresponding blade of the vertical knife crosses its path.

The shaft F is provided with an ordinary appliance to throw the wheel G in and out of gear.

We employ a shield or guard, not shown in the drawing, to protect the driver, horses, and gearing, from the flying sticks and bits of the cut hedge. This shield can be placed upon the frame L, and be provided with a slot for the horizontal knife to play through.

We am aware that machines for hedge trimming have been made with revolving knives, and I therefore do not claim such principle broadly.

What we do claim as our invention, and desire to secure by Letters Patent, is—

1. The pivoted frame L in a hedge-trimming machine, when suspended and operated so as to trim a hedge at different angles, substantially as described.

2. The combination of the frame L and support S, when constructed and operating to carry knives to trim a hedge, substantially as described and shown.

3. The knives P P' made to revolve by an equal motion, one above the other, one for trimming the side and one the top of the hedge, substantially as and for the purpose specified.

4. The combination of the pivoted frame L, pivoted support S, knives P P', shafts J and U, cog-wheels R R', with the frame A, wheels B B', the gearing D G H I, and frame E, as and for the purpose specified.

JAMES M. VAN NOSDALL.
OLIVER W. VAN NOSDALL.

Witnesses:
E. H. YOUNG,
WM. E. PALMER.